United States Patent [19]

Kordomenos et al.

[11] Patent Number: 4,902,757

[45] Date of Patent: Feb. 20, 1990

[54] HYDROXY FUNCTIONAL URETHANE POLYESTER WITH POLYMERIZED LACTONES

[75] Inventors: Panagiotis I. Kordomenos, Mt. Clemens; Andrew H. Dervan, Grosse Pointe Farms; Tab Semanision, Mt. Clemens, all of Mich.

[73] Assignee: E. I. Du Pont de Nemours & Co., Wilmington, Del.

[21] Appl. No.: 253,691

[22] Filed: Oct. 5, 1988

Related U.S. Application Data

[62] Division of Ser. No. 105,329, Oct. 7, 1987, Pat. No. 4,833,216, which is a division of Ser. No. 813,104, Dec. 24, 1985, Pat. No. 4,734,463.

[51] Int. Cl.$^4$ .................. C08G 63/08; C08G 63/18; C08G 63/20; C08L 67/02
[52] U.S. Cl. .................. 525/440; 525/454; 524/315; 524/317; 524/361; 524/363; 524/364
[58] Field of Search ............... 525/437, 440, 454, 903; 524/315, 317, 361, 363, 364

[56] References Cited

U.S. PATENT DOCUMENTS

| | | | |
|---|---|---|---|
| 4,524,192 | 6/1985 | Alexander et al. | 525/440 |
| 4,533,703 | 8/1985 | Kordomenos et al. | 525/440 |
| 4,533,704 | 8/1985 | Alexander et al. | 525/440 |

FOREIGN PATENT DOCUMENTS 2840388  3/1980  Fed. Rep. of Germany ...... 525/440

*Primary Examiner*—Allan M. Lieberman
*Assistant Examiner*—Robert E. Lee Sellers II
*Attorney, Agent, or Firm*—Hilmar L. Fricke

[57] ABSTRACT

A solvent-based thermosetting coating composition comprising a hydroxy functional urethane modified polyester resin and blocked polyisocyanate crosslinking agent. The coating composition may be formulated as a hot sprayable, high solids coating composition suitable for use as chip resistant automotive vehicle primer suitable for use on body panel areas subject to chipping by stones, gravel and other road debris. Alternatively, the composition may be formulated as a high solids composition sprayable with conventional spraying equipment. The hydroxy functional urethane modified polyester resin is the product of polymerization of lactone monomers in the presence of hydroxy-containing urethane modified polyester precursor. The polymerization reaction mixture comprises between about 10 and about 80 weight percent the hydroxy-containing urethane modified polyester precursor and between about 90 and about 20 weight percent lactone monomers.

7 Claims, No Drawings

HYDROXY FUNCTIONAL URETHANE POLYESTER WITH POLYMERIZED LACTONES

CROSS REFERENCE TO RELATED APPLICATIONS

This is a division of application Ser. No.: 07/105,329, filed Oct. 7, 1987, now U.S. Pat. No. 4,833,216, which is a divisional of application Ser. No. 813,104 filed Dec. 24, 1985, which is now U.S. Pat. No. 4,734,463 issued Mar. 29, 1988.

TECHNICAL FIELD

This invention relates to a novel hydroxy functional urethane modified polyester resin and to a novel, solvent-based, thermosetting coating composition comprising same. It relates also to such coating composition formulated, for example, as a hot sprayable, high solids coating composition suitable for use as a chip resistant automotive vehicle primer adapted for use on body panel areas subject to chipping by stones, gravel and other road debris.

BACKGROUND

Automobile manufacturers, in their efforts to extend the expected life of automobile sheet metal and the like, have directed considerable attention to various processes and compositions designed to result in not only improved corrosion resistance but also improved chip resistance properties. In particular, research and development efforts have recently been directed to obtaining primer compositions which are flexible and chip resistant and which give corrosion protection while exhibiting good humidity and solvent resistance, as well as good intercoat adhesion. New automobile designs and concern about chipping in areas exposed to stones, gravel and other road debris, e.g. rocker panels, have demanded such chip resistant primers which can be applied in reasonable thicknesses by techniques which do not require extensive and expensive processing modifications during painting operations. To date available primers, whether high or low solids, have not proven suitable.

In order to overcome the aforementioned chipping problem it has been common to apply relatively thick chip resistant coatings in body panel regions which are inclined to chip, prior to application of still another primer composition. One such chip resistant sealer material which has been employed is a polyvinyl chloride plastisol sealer which has been applied with airless spraygun equipment in thicknesses of about 20 mils in regions subject to high levels of chipping. Problems attendant with such thick coatings are readily apparent. Because of the thickness in the region to which it is applied, these materials present an appearance problem often resulting in waviness and roughness in the final coating on the sheet metal. Often times surface imperfections also result from the fact that a primer is applied over the top of this sealer, with the primer and sealer being cured together. As a result some solvent and plasticizer tend to be driven out of the polyvinyl chloride plastisol and result in a wavy and rough surface. Still further problems associated with the use of such polyvinyl chloride plastisol sealers and the like involve application technique. Since the polyvinyl chloride plastisol sealers and the like must be applied in thicknesses of 20 mils or greater in order to obtain good adhesion, they cannot be feathered down to blend in with other regions of the sheet metal which do not require the additional chip protection. Thus, the materials must be applied using a masking technique whereby those regions which are not to be coated with the sealer material are masked in a separate operation prior to application of sealer. This masking is then removed after the sealer is applied. It would obviously be desirable to eliminate these additional steps in the application of the chip resistant sealer material.

Accordingly, it is a preferred object of this invention to provide a novel solvent based, thermosetting coating composition adapted for use as a chip resistant primer, which primer may be applied in thicknesses of less than 20 mils and which may be feathered in such a manner as to blend with paint in other areas of the substrate to be painted which do not require chip resistant coating.

It is a further object of the present invention to provide a novel resins suitable for use in solvent-based thermosetting coating compositions. In this regard, it is a particular object of the invention to provide novel, hydroxy functional urethane modified polyester resins which are crosslinkable during cure on the surface of a substrate.

It is another object of the invention to provide novel coating compositions which comprise crosslinkable hydroxy functional urethane modified polyester resin and blocked polyisocyanate crosslinking agent and which provide high crosslinking efficiency and tough, well cured films at minimum bake temperatures such as when applied as automotive primers. In this regard, it is a particular object of the invention to provide a novel hydroxy functional urethane modified polyester resin/blocked polyisocyanate thermosetting coating composition of sufficiently low Volatile Organic Content (VOC) to aid in meeting governmental emissions guidelines and yet which can be applied to a substrate by spraying or other known method.

It is still another object of the invention to provide a composition which will form a coating on a substrate, which coating has advantageous physical properties including, for example, humidity and solvent resistance, flexibility and corrosion protection for the underlying substrate.

Additional aspects and advantages of the invention will be apparent from the following description thereof.

DISCLOSURE OF THE INVENTION

According to the present invention, novel crosslinkable hydroxy functional urethane modified polyester resins are provided which are suitable for use in thermosetting coating compositions, and which are especially advantageous for use in high solids and chip resistant, organic solvent based thermosetting coating compositions. The hydroxy functional urethane modified polyester resins of the invention preferably have a number average molecular weight ($\overline{M}n$) of about 2,000 to about 20,000 and are the product of polymerization of lactone monomers in the presence of hydroxy-containing urethane modified polyester precursor preferably (i) having a number average molecular weight ($\overline{M}n$) between about 1,000 and about 10,000, (ii) having a hydroxy number between about 30 and about 300, and (iii) containing between about 1 and about 10 urethane groups per molecule wherein pendant hydroxyl terminated polycaprolactone moieties are formed and attached to the polyester precursor. The polymerization of the lactone monomers is preferably carried out at a temperature between about 50° C. and about 300° C. The polymerization reaction mixture comprises between about 10 and about 80 weight percent hydroxy-containing urethane modified polyester precursor and between about 90 and about 20 weight percent lactone monomer.

A first preferred type of such hydroxy-containing urethane modified polyester precursor suitable for forming the hydroxy functional resin of this invention is the reaction product of:
  (A) urethane modified diol being the reaction product of: (a) diol and (b) diisocyanate, wherein the diol and diisocyanate are reacted in a molar ratio of from about 4:1 to about 4:3, respectively;
  (B) polyol comprising at least about 5 weight percent triol; and
  (C) acid component selected from dicarboxylic acids and anhydrides thereof.

Preferably, this first preferred type of such precursor has a hydroxyl number between about 30 and about 200.

A second preferred type of such hydroxyl-containing urethane modified polyester precursor suitable for forming the hydroxy functional resin of this invention is the reaction product of:
  (A) hydroxy functional polyester resin being the reaction product of: (a) polyhydroxy material comprising diols and triols and (b) acid component selected from dicarboxylic acids and anhydrides thereof, wherein (a) and (b) are reacted in amounts so as to provide hydroxyl groups and carboxyl groups in a ratio of from about 6:2 to about 6:5, respectively; and
  (B) diisocyanate, wherein (A) and (B) are reacted in amounts so as to provide hydroxyl groups and isocyanate groups in a ratio of from about 4:1 to about 10:1, respectively.

Preferably, this second preferred type of such precursor has a hydroxyl number between about 50 and about 250 and contains between about 1 and about 7 urethane groups per molecule. Preferably, the polyhydroxy materials comprise diols and triols in a hydroxyl equivalent ratio of from about 4:1 to about 1:4, respectively, more preferably this ratio is about 3:1 to about 3:2.5.

Also according to the present invention, a novel, organic solvent based, thermosetting resin/crosslinking agent composition, in addition to solvent and any pigments and additives such as, for example, catalyst, flow control agents and the like, comprises the hydroxy functional urethane modified polyester resin of the invention and blocked polyisocyanate crosslinking agent preferably selected from the group consisting of, but not necessarily limited to, blocked trifunctional isocyanurate ring containing polyisocyanates and oligoester modified blocked isocyanates.

Particularly preferred compositions of the invention are those formulated as high solids coating compositions having solids levels in the range of 65–80% solids and which are applied as chip resistant primers in those areas of automotive panels, such as rocker panels, which are exposed to high levels of chipping. Such compositions may be applied in thicknesses ranging from 1 to 25 mils wet to obtain final coatings in the range of 1 to 12 mils dry, and may be feathered down to blend in with paint applied to regions outside that requiring additional chip resistance protection. Generally, the compositions of this solids level may be applied using hot spray equipment at temperatures in the range of room temperature, i.e., about 70° F., to about 160° F.

Other preferred compositions of the invention are those formulated as high solids coating compositions adapted to be applied by conventional spraying onto a substrate. These high solids coating compositions may have a solids level in the range of 50–60% and are especially useful as a primer coating on the bare, unpolished metal surface of an automotive vehicle. As used herein, a high solids coating composition is one having a volatile organic content of about 479 g/l (4.0 lb./gal.) or less.

Other features and advantages of this invention will become more apparent from the following, detailed description thereof including the preferred embodiments and best mode of carrying out this invention.

DETAILED DESCRIPTION OF THE INVENTION

More specifically, the invention relates to a novel hydroxy functional urethane modified polyester resin suitable for use in a thermosetting coating composition and to a thermosetting coating composition comprising that hydroxy functional resins and a blocked polyisocyanate crosslinking agent.

The novel, hydroxy functional urethane modified polyester resin preferably has a number average molecular weight ($\overline{M}n$) between about 2,000 and about 20,000, preferably between about 2,000 and about 6,000, and is the product of polymerization of lactone monomers in the presence of hydroxy-containing urethane modified polyester precursor (i) having a number average molecular weight ($\overline{M}n$) between about 1,000 and about 10,000, (ii) having a hydroxyl number of 30–300, and (iii) containing between about 1 and about 10 urethane groups per molecule. One preferred type of precursor suitable for use in this invention is the reaction product of urethane modified diols with polyol and acid component. A second preferred type of precursor suitable for use in this invention is the reaction product of polyester polyol resins with diisocyanate. The polymerization of lactone monomers with the precursor is preferably carried out at a temperature between about 50° C. and about 300° C., more preferably at a temperature of between about 130° C. and about 200° C. The polymerization reaction mixture comprises between about 10 and about 80 weight percent hydroxy-containing urethane modified polyester precursor and between about 90 and about 20 weight percent lactone monomers. Preferably, the polymerization reaction mixture comprises between about 35 and about 65 weight percent hydroxy-containing urethane modified polyester precursor and between about 65 and 35 weight percent lactone monomers.

Thermosetting compositions of the invention comprise the above hydroxy functional urethane modified polyester resin and blocked polyisocyanate crosslinking agent comprising at least two isocyanate groups which have been blocked by reaction with an active hydrogen bearing blocking agent. The blocked polyisocyanate crosslinking agent is included in the composition in an amount such that upon deblocking of the blocked isocyanate groups thereof at the cure temperature of the composition, the crosslinking agent provides between about 0.5 and about 1.6 reactive isocyanate groups per hydroxy group on the hydroxy functional urethane modified polyester resin.

Each of the above major components of the compositions as well as other components and other aspects of the invention are described hereinafter in greater detail.

A. Hydroxy Functional Urethane Modified Polyester Resin

As described above, this copolymer is the product of polymerization of lactone monomer in the presence of hydroxy-containing urethane modified polyester precursor.

It is believed to be a significant characterizing aspect of the hydroxy functional urethane modified polyester resin of the invention that the polymerized lactone portion of this hydroxy functional resin gives the resin flexibility as well as toughness, two key properties when choosing a primer for use in areas susceptible to chipping. Still further, because the hydroxy functional urethane modified polyester resins of the invention are branched, they require a minimum amount of crosslinking in order to obtain a suitable network for good coating integrity.

Each of the reactants employed in the preparation of the hydroxy functional urethane modified polyester resin is described in greater detail below.

(i) Hydroxy-Containing Urethane Modified Polyester Precursor

The hydroxy-containing urethane modified polyester precursor employed to make the hydroxy functional urethane modified polyester resins of the invention (i) have a number average molecular weight ($\overline{M}n$) between about 1,000 and about 10,000, (ii) have a hydroxyl number between about 30 and about 300, and (iii) contain between about 1 and about 10 urethane groups per molecule. Two preferred types of precursors suitable for use in forming the hydroxy functional resin of this invention are hereinafter described in detail. While two preferred types of precursors are disclosed herein, this disclosure is not meant to limit the precursor to these preferred types. Other hydroxy-containing urethane modified polyester precursor suitable for use in forming the hydroxy functional resin of this invention will be apparent to those of the art in view of the present disclosure.

A first preferred type of precursor suitable for use in forming the hydroxy functional urethane modified polyester resin of this invention is the reaction product of:

(A) urethane modified diol being the reaction product of: (a) diol and (b) diisocyanate, wherein the diol and the diisocyanate are reacted in a molar ratio of from about 4:1 to about 4:3, respectively;

(B) polyol comprising at least about 5 weight percent triol; and (C) acid component selected from dicarboxylic acids and anhydrides thereof.

In forming the urethane modified diol, the diol and diisocyanate are preferably reacted in a molar ratio of from about 2:0.8 to about 2:1.2, respectively, most preferably in a 2:1 molar ratio. This first type of precursor, which is the reaction product of urethane modified diol, polyol and acid component, preferably has a number average molecular weight ($\overline{M}_n$) between about 2,000 and about 4,000 and a hydroxyl number preferably between about 30 and about 200. Most preferably the hydroxyl number is between about 50 and about 120.

The diols employed in making the urethane modified diol include, but are not limited to, alkylene glycols, such as butylene glycol, neopentyl glycol, 1,5-pentene glycol, 3-cyclohexene-1,1-dimethynol, other glycols such as hydrogenated bisphenol A, caprolactone diol (e.g., the reaction product of caprolactone and ethylene glycol), hydroxy alkylated bisphenols, polyether glycols, e.g., poly(oxytetramethylene)glycol, and polyester diols, e.g., 2,2-dimethyl-3-hydroxypropyl-2,2-dimethyl-3-hydroxypropionate, and the like. Prefered diols are neopentyl glycol and 2,2-dimethyl-3-hydroxypropyl-2,2-dimethyl-3-hydroxy-propionate, the latter material being commercially available as Esterdiol 204 (trademark, Union Carbide Corp., Danbury, Conn.). While various types of diols have been mentioned above as suitable for use as the diol component in making the urethane modified diol, their disclosure is not meant to be limiting. Selection of other diols which would be suitable for use in forming the urethane modified diol would be well within the skill of those in the art in view of the present disclosure. Mixtures of diols may also be employed in making the urethane modified diol. Still further, in view of the principles discussed above for forming the urethan modified diol, one skilled in the art would appreciate that triols may be used in place of the diols to form urethane modified triols which may be employed herein.

The diisocyanate employed in making the urethane modified diols may be essentially any diisocyanate and numerous diisocyanates are well known in the art. The diisocyanate may be any of a number of aliphatic, cycloaliphatic, and aromatic diisocyanates, such as those selected from the group which includes, but which is not limited to, hydrocarbon diisocyanates and substituted hydrocarbon diisocyanates, such as 1,6-hexamethylene diisocyanate, isophorone diisocyanate, p-phenylene diisocyanate, biphenyl diisocyanate, toluene diisocyanate, and 3,3-dimethyl-4,4-biphenylene diisocyanate. As would be apparent to those skilled in the art in view of the present disclosure, mixtures of various diisocyanates also may be employed as the diisocyanate component used in forming the urethane modified diol.

The polyol component, used in forming the first preferred hydroxy-containing urethane modified polyester precursor described above, comprises at least about 5 weight percent triol (based on the weight of the polyol component). Preferred triols are conventional low molecular triols such as 1,2,6-hexane triol, 1,1,1-trimethylol propane, 3-(2-hydroxy-propoxy)-1,2-propanediol and polycaprolactone triols, which are commercially available as, for example, TONE-301 (trademark, Union Carbide Corp., Danbury, Conn.). This polyol component may also comprise, in addition to the triols, other polyol materials such as diols or tetrols. Preferably, however, these other polyols, when employed, consist of diols. Examples of suitable diols which may be included in the polyol component are those which have been disclosed above as suitable for forming the urethane modified diol. Preferred diols for use in the polyol component are linear aliphatic diols. While the polyol component may comprise materials such as diols in addition to the triols the polyol component may consist essentially of triols. By employing diols in the polyol component in addition to the triols the flexibility of the coating composition is generally increased. Thus, selection of the polyol component to be used in forming the first preferred hydroxy-containing urethane modified polyester precursor will be dependent on the particular desired properties and application of the coating composition. When diols are employed in the polyol component, the polyol preferably comprises from about 10 to about 80 weight percent triols and from about 90 to about 20 weight percent diols.

The acid component used to form the first preferred hydroxy-containing urethane modified polyester precursor is selected from the group comprising aliphatic, aromatic, and cycloaliphatic dicarboxylic acids and anhydrides thereof. Numerous examples of such dicarboxylic acids and anhydrides are well known to those in the art. Preferably the acid component is selected from the group comprising $C_6-C_{40}$ dicarboxylic acids and anhydrides thereof, which group includes, but is not limited to, adipic acid, azelaic acid, sebasic acid, dodecane dicarboxylic acid, dimer acid and cyclohexane dicarboxylic acid and anhydrides thereof. Mixtures of suitable acids and/or their anhydrides may also be used as the acid component in forming this precursor.

In forming the first preferred type of hydroxy-containing urethane modified polyester precursor, the diol (a) and the diisocyanate (b) are combined and reacted, generally at an elevated temperature, so as to form the urethane modified diol. The ratio of the diol to diisocyanate (i.e., a molar excess of diol) is such that at the completion of this reaction substantially no unreacted isocyanate groups are present. This urethane modified diol is then combined and reacted with the polyol and acid component, generally in the presence of a catalyst and at elevated temperatures, so as to effect formation of the hydroxy-containing urethane modified polyester precursor. Catalysts desirably assure a rapid and/or more complete carboxyl/hydroxyl condensation reaction. Exemplary of catalysts which may be so employed are dibutyl tin oxide, hydrated monobutyl tin oxide, butylchlorotin dihydroxide, butyl tin tris(2-ethylhexoate), tetraisopropyl titanate, strong acids such as p-toluene sulfonic acid, phosphoric acid, sulfuric acid, and materials such as zinc, oxide, antimony oxide ($Sb_2O_3$) and sodium acetate. Still other catalysts useful for this purpose will be apparent to those skilled in the art in view of the present disclosure.

A second preferred type of precursor suitable for forming the hydroxy functional resins of this invention is the reaction product of:
(A) hydroxy functional polyester resin being the reaction product of: (a) polyhydroxy material comprising diols and thiols with (b) acid component selected from dicarboxylic acids and anhydrides thereof, wherein (a) and (b) are reacted in amounts so as to provide hydroxyl groups and carboxyl groups in a ratio from about 6:2 to about 6:5, respectively; and
(B) diisocyanate, wherein (A) and (B) are reacted in amounts so as to provide hydroxyl groups and isocyanate groups in a ratio of from about 4:1 to about 10:1, respectively.

Preferably, the polyhydroxy materials comprise the diols and triols in a hydroxyl equivalent ratio from about 4:1 to about 1:4, respectively, more preferably from about 3:1 to about 3:2.5. By hydroxyl equivalent ratio is meant the ratio of the hydroxyl equivalents of the diol to the hydroxyl equivalents of the triol. This second preferred type of precursor, which is the reaction product of hydroxy functional polyester resin and diisocyanate, preferably has a number average molecular weight ($\overline{M}_n$) between about 2000 and about 4000 and a hydroxyl number preferably between about 50 and about 250, and preferably contains between about 1 and about 7 urethane groups per molecule.

The diols, triols, acid components and diisocyanates which are employed in forming this second preferred type of hydroxy-containing urethane modified polyester precursor may be selected from such reactants described above for making the first preferred type of hydroxy-containing urethane modified polyester precursor. Their disclosure is not, however, meant to be limiting. Still other diols, triols, acid components and diisocyanates which may be employed in this invention in forming this second preferred type of precursor would be apparent to those of the art in view of the present disclosure. In forming this second preferred type of precursor, the polyhydroxy materials (i.e., diols, triols and optionally tetrols, etc.) and acid component are combined and reacted, generally at elevated temperatures and in the presence of a catalyst, so as to effect formation of a hydroxy functional polyester resin. Catalysts useful to accelerate the carboxyl/hydroxyl condensation reaction are well known in the art. Suitable carboxyl/hydroxyl catalysts have been previously disclosed herein. Others are known to those of the art. This hydroxy functional polyester resin is then modified by reaction with the diisocyanate, whereby urethane groups are incorporated into the polyester resin forming the second preferred type of hydroxy-containing urethane modified polyester precursor.

The reactions, whereby either the first or second preferred type of precursor is formed, are generally carried out in the presence of solvents commonly employed for coating formulations such as toluene, xylene, methyl amyl ketone, etc.

Other suitable hydroxy-containing urethane modified polyester precursors are commercially available and known to those skilled in the art and would be apparent in view of this disclosure.

(ii) Lactone Monomers

The lactone reactant may be any lactone, or combination of lactones, having at least six carbon atoms, for example, from six to eight carbon atoms, in the ring and at least one hydrogen substituent on the carbon atom which is attached to the oxy group in said ring. In one aspect, the lactone used as a reactant can be represented by the general formula:

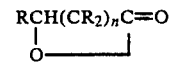

in which n is at least four, for example, from four to six, at least n+2 R's are hydrogen, and the remaining R's are substituents selected from the group consisting of hydrogen, alkyl, cycloalkyl, alkoxy and single ring aromatic hydrocarbon radicals. Lactones having greater numbers of substituents other than hydrogen on the ring, and lactones having five or less carbon atoms in the ring, are considered unsuitable for the purposes of the invention because of the tendency that polymers thereof have to revert to the monomer, particularly at elevated temperature.

The lactones preferred in this invention are the epsilon-caprolactones having the general formula:

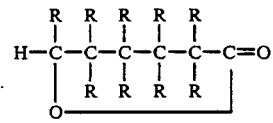

wherein at least six of the R's are hydrogen and the remainder are hydrogen, alkyl, cycloalkyl, alkoxy or single ring aromatic hydrocarbon radicals, none of the substituents contain more than about twelve carbon atoms, and the total number of carbon atoms in the substituents on a lactone ring does not exceed about twelve. Unsubstituted epsilon-caprolactone, in which all the R's are hydrogen, is derived from 6-hydroxyhexanoic acid and is most preferred. Substituted epsilon-caprolactones, and mixtures thereof, are available by reacting a corresponding substituted cyclohexane with an oxidizing agent such as peracetic acid.

Among the substituted epsilon-caprolactones considered most suitable for the purposes of the invention are the various monoalkyl epsilon-caprolactones such as the monomethyl-, monoethyl-, monopropyl-, monoisopropyl-, etc. to monododecyl epsilon-caprolactones; dialkyl epsilon-caprolactones in which the two alkyl groups are substituted on the same or different carbon atoms, but not both on the epsilon carbon atom; trialkyl epsilon-caprolactones in which two or three carbon atoms in the lactone ring are substituted, so as long as the epsilon carbon atom is not distributed; alkoxy epsilon-caprolactones such as methoxy and ethoxy epsilon-caprolactones; and cycloalkyl, aryl, and aralkyl epsilon-caprolactones such as cyclohexyl, phenyl and benzyl epsilon-caprolactones.

Lactones having more than six carbon atoms in the ring, e.g., zeta-enatholactone and eta-caprylolactone may also be polymerized in accordance with the invention.

Polymerization of the lactones in accordance with this invention is carried out in conventional manner in that the polymerization is initiated by reaction with a compound having at least one reactive hydrogen capable, with or without the aid of a catalyst, of opening the lactone ring and adding it as an open chain without forming water of condensation—in this case the initiator compound being the hydroxy functional urethane modified polyester precursor described above. Pendant hydroxyl terminated polycaprolactone moieties are formed and attached to the polyester precursor.

The polymerization reaction mixture comprises between about 10 and about 80 weight percent of the above described hydroxy functional urethane modified polyester precursor and between about 10 and about 20 weight percent of the lactone monomers. Preferably, the polymerization reaction mixture comprises between about 35 and about 65 weight percent of the hydroxy functional urethane modified polyester precursor and between about 65 and about 35 weight percent of the lactone monomers.

To initiate and continue the polymerization of the lactone, the lactone and the initiator (i.e., the precursor) are preferably heated to a temperature between about 130° and 200° C. in order to achieve a practical and desirable rate of reaction with a minimum of decomposition. The temperature may be considerably lower however, i.e., as low as about 50° C. at the sacrifice of speed of reaction. It may also be considerably higher, i.e., up to about 300° C., although care must be taken at such higher temperatures because of the more likely losses, at temperatures above 250° C., due to decomposition or undesirable side reactions. Generally, therefore, a temperature range of 50° to 300° C. is considered operable and a more limited range between about 130° and 200° C. is considered preferable.

The polymerization may be, and preferably is, carried out with the use of a catalyst, such as a basic or neutral ester interchange catalyst, to accelerate the reaction. Among catalysts suitable for this purpose are such metals as lithium, sodium, potassium, rubidium, cesium, magnesium, calcium, barium, strontium, zinc, aluminum, titanium, cobalt, germanium, tin, lead, antimony, arsenic and cerium, as well as the alkoxides thereof. Additional suitable catalysts are, by way of example, the carbonates of alkali- and alkaline earth metals, zinc borate, lead borate, zinc oxide, lead silicate, lead arsenate, litharge, lead carbonate, antimony trioxide, germanium dioxide, cerium trioxide, cobaltous acetate and aluminum isopropoxide. Catalyst concentrations between about 0.001 and 0.5%, based on the weight of the starting lactones, are suitable. The preferred range is from 0.01 to 0.2%.

The hydroxy functional urethane modified polyester resin polymerization products obtained in accordance with the invention have number average molecular weights ($\overline{M}n$) generally upwards of about 2,000, preferably within the range of about 2,000 to about 20,000, although number average molecular weights below and substantially above this range are obtainable if desired. Most preferably, the resin polymerization products have a number average molecular weight between about 2,000 and about 6,000. Also, while not wishing to be bound by theory, it presently is understood that the chemical structure of the hydroxy functional urethane modified polyester resin is as follows. They have reactive terminal hydroxyl groups. Further, it presently is understood that they are characterized by the presence of series of interconnected, substantially linear units or groups composed of carbon, hydrogen and oxygen. The interconnected units are opened lactone residues each having a terminal oxy group at one end, a carbonyl group at the other end, an intermediate chain of at least five carbon atoms and at least one hydrogen substituent on the carbon atom in the intermediate chain that is attached to the terminal oxy group. The oxy group of one lactone residue is connected to the carbonyl group of an adjacent lactone residue in the series and the oxy group of the last lactone residue in a series is connected to a hydrogen to form a terminal hydroxyl group at one end of the series.

B. Crosslinking Agent

The crosslinking agent employed in the novel solvent based coating compositions of the invention comprises blocked polyisocyanate. The novel solvent based coating compositions of the invention, as a result of employing blocked polyisocyanate crosslinking agents, exhibit exceptional shelf stability even when corrosion inhibiting pigments such as zinc chromate are used in high concentrations.

As used herein "blocked polyisocyanate" means an isocyanate compound containing two or more isocyanate groups, all of which have been reacted with a material which will prevent reaction of the isocyanate group at room temperature with compounds that conventionally react with such groups, and at least some of which will permit that reaction to occur at higher (cure) temperatures. In general the blocked polyisocyanate may be prepared by reacting a sufficient quantity of an active hydrogen containing blocking agent with the polyisocyanate to insure that no free isocyanate groups are present. The blocking agent may be represented by the formula BH and may be selected from numerous materials, hereinafter discussed, which bear an active hydrogen.

The blocked polyisocyanate crosslinking agent is included in compositions of the invention in amounts such that upon deblocking of the blocked isocyanate groups at the cure temperature of the composition, the crosslinking agent provides between about 0.5 and about 1.6, preferably between about 0.8 and about 1.3, reactive isocyanate groups per hydroxy group on the film forming hydroxy functional urethane modified polyester resin of the coating composition as described above. Blocked polyisocyanates of numerous types may be employed in the compositions of the invention. Particularly suitable blocked polyisocyanates, which will be discussed further hereinafter, are those selected from the group consisting of blocked polymethylene polyphenol isocyanates, isocyanurate ring containing blocked polyisocyanates and certain oligoester modified blocked polyisocyanates.

In the preparation of the blocked polyisocyanate crosslinking agent, any suitable organic polyisocyanate may be used. Representative examples are the aliphatic compounds such as trimethylene, tetramethylene, pentamethylene, hexamethylene, 1,2-propylene, 1,2-butylene, 2,3-butylene, 1,3-butylene, ethylidine and butylidene diisocyanates; the cycloalkylene compounds such as 1,3-cyclopentane, 1,4-cyclohexane, and 1,2-cyclohexane diisocyanates; the aromatic compounds such as m-phenylene, p-phenylene, 4,4'-diphenyl, 1,5-naphthalene, and 1,4-naphthalene diisocyanates, the aliphatic-aromatic compounds such as 4,4'-diphenylene methane, 2,4- or 2,6-tolylene, or mixtures thereof, 4,4'-toluidine, and 1,4-xylylene diisocyanates; substituted aromatic compounds such as dianisidine diisocyanate, 4,4'-diphenylether diisocyanate and chlorodiphenylene diisocyanate; the triisocyanates such as triphenyl methane-4,4,4''-triisocyanate, 1,3,5-triisocyanate benzene and 2,4,6-triisocyanate toluene; the tetraisocyanates such as 4,4'-diphenyl-dimethyl methane-2,2',5,5'-tetraisocyanate; and the polymerized polyisocyanates such as tolylene diisocyanate dimers and trimers, and the like.

In addition, the organic polyisocyanate may be a prepolymer derived from a polyol including polyether polyol or polyester polyol, including polyethers which are reacted with excess polyisocyanates to form isocyanate-terminated prepolymers. The polyols may be simple polyols such as glycols, e.g., ethylene glycol and propylene glycol, as well as other polyols such as glycerol; trimethylolpropane, pentaerythritol, and the like, as well as mono-ethers such as diethylene glycol, tripropylene glycol and the like and polyethers, i.e., alkylene oxide condensates of the above. Among the alkylene oxides that may be condensed with these polyols to form polyethers are ethylene oxide, propylene oxide, butylene oxide, styrene oxide and the like. These are generally called hydroxyl-terminated polyethers and can be linear or branched. Examples of polyethers include polyoxyethylene glycol, polyoxypropylene glycol, polyoxytetramethylene glycol, polyoxyhexamethylene glycol, polyoxynonamethylene glycol, polyoxydecamethylene glycol, polyoxydodecamethylene glycol and mixtures thereof. Other types of polyoxyalkylene glycol ethers can be used. Especially useful polyether polyols are those derived from reacting polyols such as ethylene glycol, diethylene glycol, triethylene glycol, 1,4-butylene glycol, 1,3-butylene glycol, 1,6-hexanediol, and their mixtures; glycerol, trimethylolethane, trimethylolpropane, 1,2,6-hexanetriol, pentaerythritol, dipentaerythritol, tripentaerythritol, polypentaerythritol, sorbitol, methyl glucosides, sucrose and the like with alkylene oxides such as ethylene oxide, propylene oxide, their mixtures, and the like.

A particular class of aromatic polyisocyanates which may be employed in the novel solvent based coating compositions of the invention are polymethylene polyphenol isocyanates having the general formula:

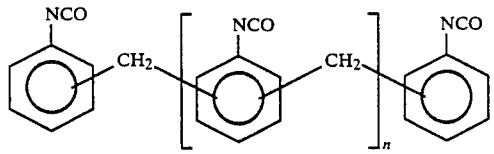

wherein n equals 1 to 3. Such compounds, sold under the tradename "PAPI" by the UpJohn Chemical Company of Kalamazoo, Mich., have proven to be particularly useful in compositions of the invention, resulting in compositions exhibiting desirable toughness in the final cured coating.

The active hydrogen containing blocking agents which are reacted with the above described organic diisocyanates may be selected from numerous blocking agents which will be apparent to those skilled in this art. Representative of those blocking agents which are preferred are those selected from the group consisting of (i) aliphatic, cycloaliphatic and aromatic alkyl monoalcohols; (ii) hydroxyl amines; (iii) oximes; (iv) lactams; and (v) triazoles. Any suitable aliphatic, cycloaliphatic or aromatic alkyl monoalcohol may be used as a blocking agent in accordance with the present invention. For example, aliphatic alcohols, such as methyl, ethyl, chloroethyl, propyl, butyl, amyl, hexyl, heptyl, octyl, nonyl, 3,3,5-trimethylhexyl, decyl, and lauryl alcohols, and the like may be employed. Suitable cycloaliphatic alcohols include, for example, cyclopentanol, cyclohexanol and the like, while aromatic-alkyl alcohols include phenylcarbinol, methylphenylcarbinol, and the like. Minor amounts of even higher molecular weight relatively non-volatile monoalcohols may be used, if desired, to serve as plasticizers in the coatings provided by the invention. Examples of hydroxyl amines which may be employed as blocking agents include ethanol amine and propanol amine. Suitable oxime blocking agents include, for example, methylethylketone oxime, acetone oxime and cyclohexanone oxime. Examples of lactams which may be used as blocking agents are epsilon-caprolactam, epsilon-butyrolactam and pyrrolidone, while suitable triazoles include compounds such as 1,2,4-triazole, 1,2,3-benzotriazole, 1,2,3-tolyl triazole and 4,5-diphenyl-1,2,3-triazole. Particularly preferred active hydrogen containing blocking agents are methylethyl ketoxime and 2-ethylhexanol.

(i) Isocyanurate Ring Containing Blocked Isocyanate Compounds

Within the scope of the above general class of blocked polyisocyanate crosslinking agents, a particular class type of blocked polyisocyanate crosslinking agent which may be employed in the novel solvent based coating compositions of the invention comprises isocyanurate ring containing blocked isocyanate compounds. In general, these blocked polyisocyanates may be formed by blocking with the aforementioned blocking agent isocyanurate ring containing polyisocyanates. These compounds may be formed by cyclotrimerization of difunctional isocyanates. Usually, the reaction does not stop in this stage and continues through the formation of polyfunctional oligomers or a mixture of such oligomers with a portion of the pure trifunctional polyisocyanate. Mixtures of trifunctional product and various polyfunctional oligomers are commercially available.

A particularly desirable blocked polyisocyanate crosslinking agent is the blocked form of the pure trifunctional isocyanurate represented by the following formula:

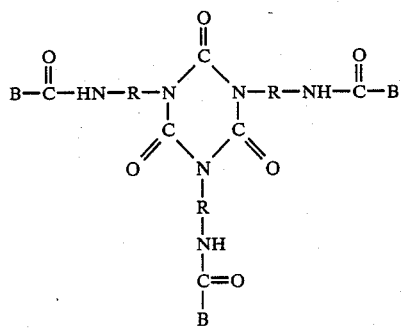

wherein R is selected from the group consisting of aliphatic, cycloaliphatic and aromatic groups and combinations thereof and B is the residue of an active hydrogen containing blocking agent. More specifically, this compound is disclosed in U.S. Pat. No. 4,491,663, the disclosure of which is hereby incorporated by reference.

(ii) Oligoester Modified Blocked Polyisocyanates

Still further particular blocked polyisocyanates useful as crosslinking agents in the novel solvent based coating compositions of this invention are oligoester modified blocked polyisocyanates prepared from a particular class of oligoester diols and triols. A first type of such oligoester modified blocked polyisocyanates is prepared from organic diisocyanates bearing one isocyanate group more reactive than the other, with the more reactive isocyanates first being blocked with a blocking agent and the remaining isocyanate group then being reacted with hydroxyl functionality of an oligoester diol or triol as referred to above. The second type of oligoester modified blocked polyisocyanate may be prepared by reacting oligoester diols from the aforementioned class of oligoesters with an excess of organic diisocyanate so as to form an isocyanate terminated prepolymer followed by blocking of the terminal isocyanate groups of the prepolymer with an active hydrogen containing blocking agent. Each of these materials is particularly useful in the compositions of the invention and produces final cured coating compositions exhibiting outstanding flexibility.

Oligoesters of the type employed in the preparation of these crosslinking agents are described in U.S. Pat. No. 4,322,508 issued Mar. 30, 1982, the disclosure of which is hereby incorporated by reference. The hydroxy functional oligoesters within the useful class materials (i) have a number average molecular weight ($\overline{M}_n$) between about 150 and about 3000, preferably between about 230 and about 1000, (ii) bear 2 or 3 hydroxyl groups per molecule, and (iii) are formed by an esterification reaction between a carboxylic acid and an epoxide. The esterification reaction products are selected from the group consisting of:

(a) the esterification reaction product of polycarboxylic acid, i.e., carboxylic acid bearing 2 or more carboxyl groups, and monoepoxide;

(b) the esterification reaction product of polyepoxide, i.e., a compound having 2 or more epoxide groups, and monocarboxylic acid, preferably containing no ethylenic unsaturation, and bearing no hydroxy functionality;

(c) the esterification reaction product of hydroxy functional carboxylic acid and mono- or polyepoxide, preferably monoepoxide;

(d) the esterification reaction product of monocarboxylic acid and hydroxy functional mono- or polyepoxide, preferably monoepoxide; and (e) mixtures of (a)-(d).

As noted above, the first type of oligoester modified blocked polyisocyanate crosslinking agent is prepared by (i) reacting organic diisocyanate bearing one isocyanate group which is more reactive than the other with a sufficient amount of an active hydrogen containing blocking agent to react substantially with all of the more reactive isocyanate groups, thus providing a half-blocked diisocyanate and (ii) reacting this half-blocked intermediate with the above discussed oligoester. The organic diisocyanates employed in this synthesis, as well as the active hydrogen containing blocking agents, are discussed above in connection with the preparation of the isocyanurate ring containing blocked isocyanate crosslinking agents useful in compositions of the invention. The organic polyisocyanate-blocking agent adduct intermediate is formed by reacting a sufficient quantity of the blocking agent with the organic diisocyanate to insure that one of the two —NCO groups on the diisocyanate is reacted. The reaction between the organic diisocyanate and the blocking agent is exothermic; therefore, the diisocyanate and the blocking agent are preferably admixed at temperatures no higher than about 80° C., preferably below about 50° C., to minimize the exothermic effect.

This intermediate is next reacted with the oligoester diol or triol described above so as to react substantially all free or unblocked isocyanate groups of the diisocyanate/blocking agent intermediate with hydroxyl groups of the oligoester. This reaction is carried out desirably at a temperature of about 80°-120° C.

As also discussed above, the second type of oligoester modified blocked polyisocyanate crosslinking agent useful in the novel solvent based coating compositions of the invention is prepared by reacting an excess of organic diisocyanate with an oligoester diol from the above described class of oligoesters followed by reaction of the terminal isocyanate groups formed on the resultant prepolymer with an active hydrogen containing blocking agent as described above so as to react with substantially all the isocyanate groups. The diisocyanate starting material is used in excess in amounts sufficient to insure that the intermediate is isocyanate terminated. Therefore, it is preferable that the organic diisocyanates and the dihydroxy functional oligoester be reacted in a molar ratio of from greater than 1:1 up to 2:1. Numerous diisocyanates of the type described hereinbefore may be employed in the preparation of this intermediate. While it is not necessary that one isocyanate group be more reactive than the other, the preparation of this type of crosslinking agent does not preclude the use of such material.

C. General Discussion—Other Aspects of Invention and Other Components

The coating compositions of the invention have been found to provide a cured coating having the advantageous physical properties described above, over a wide range of cure temperatures and a wide range of solids levels. More specifically, the coating compositions according to preferred embodiments of the invention have been found to cure at temperatures from as low as about 120° C. or less within about 15 minutes or less, and yet to cure and suffer no significant loss of advantageous physical properties at temperatures as high as about 200° C. or more for periods up to about 60 minutes or more. Considered together with the storage stability of the coating composition, it can be readily recognized that the present invention provides a highly significant advance in the coating composition art.

It will be within the skill of the art to determine the proper Volatile Organic Content (VOC) for a given coating composition of the invention and for a given application. Preferred solvents have relatively low volatility at temperatures appreciably below their boiling points such that solvent evaporation is low during storage and/or application of the coating composition to the substrate. A suitable solvent system may include, for example, toluene, methyl ethyl ketone, isobutyl acetate, xylene, cellosolve acetate, acetone and a mixture of any of them. Other solvents which may be employed include terpenes, aliphatic and aromatic naphthas, and the like. Additional suitable solvents are commercially available and will be apparent to the skilled of the art in view of the present disclosure.

Any solvent allowed to remain in the cured coating should be inert so as to avoid adverse effect upon the cured coating or upon another coating layer used in conjunction with it during the curing process or thereafter. Preferably, the cured coating is susbstantially free of solvent.

Sufficient solvent is used to reduce the viscosity of the coating composition to a level suitable for application to the substrate in the desired manner.

Obviously, in those cases where the composition is to be applied as a chip resistant primer the amount of solvent will be reduced so as to give a solids level of about 65–80%. Such higher solids materials are generally applied using hot spray equipment.

Flow control agent(s), for example, polybutyl acrylate; wetting agent(s), for example, silicone; pigments; pigment dispersants; corrosion inhibitors, for example, chromate pigments, numerous of all of which are known to the skilled of the art, may be employed in the coating compositions of the invention. In addition, suitable reactive additives can be used, including, for example, low molecular weight diol flow control agents and reactive diluents.

Compositions of the invention, and in particular the chip resistant primers of the invention, may also include anti-settling or anti-sagging agents to control the thixotropic properties of the composition. Exemplary of available materials suitable for this purpose are Dislon (trademark) 6900-20X manufactured by Kusumoto Chemicals, Ltd., Tokyo, Japan and sold by King Industries, Norwalk, CT 06852; Bentone (trademark) 38, N. L. Industries, Highstown, N.J. 08520; and Cab-O-Sil (trademark) M-5, Cabot Corporation, Boston, Mass.

Curing the coating composition requires baking for sufficient time at sufficiently elevated temperature to react the crosslinking agent with the hydroxyl functionality of the hydroxy functional urethane modified polyester resins. The time and temperature required to cure the coating are interrelated and depend upon the particular hydroxy functional urethane modified polyester resin, crosslinking agent, solvent and other materials, if any, and the amount of each comprising the coating composition. The coating compositions according to preferred embodiments of the invention, as described above, have been found to provide the best coating results when cured at temperature at about 150° C. (300° F.) for 20 minutes. It is a highly significant advantage of the invention, however, that these same coating compositions can withstand, for example, temperature as high as about 200° C. (390° F.) for periods of time as long as about 60 minutes. Accordingly, great flexibility is provided in both designing and implementing a curing schedule for parts coated with the coating compositions of the invention. Thus, in the assembly of automotive vehicles, for example, vehicles unavoidably held in a curing oven for long periods of time during unplanned assembly line shut-downs are recovered with cured and unharmed coatings.

High solids coating compositions according to the present invention, comprising the novel crosslinkable hydroxy functional urethane modified polyester resins of the invention, especially the preferred resins described above and blocked polyisocyanate crosslinking agent, especially the preferred materials described above, have been found to afford cured coatings with improved corrosion resistance and chip resistance, thus representing a highly advantageous advance in the art.

A most preferred use of the coating composition of the invention is as a high solids hot sprayable chip resistant primer for use on a bare metal substrate such as for an automotive vehicle body which is subject to chipping. Primer compositions typically are pigmented and any pigments commonly included in primer compositions for metal substrates and acrylic dispersion topcoats such as, for example, carbon black, iron oxide, lithopone, magnesium, silicate, silica, barium sulfate, $TiO_2$, chrome yellow, calcium chromate, strontium chromate, zinc potassium chromate any the like may be used. The primer can be pigmented according to known methods including, for example, by grinding pigments in a portion of the curable resin and adding to the primer composition.

The pigment-to-binder ratio of the chip resistant primer may be from about 0.5:1 to about 2:1 by weight, respectively; it is preferred, however, to use a primer having a pigment-to-binder ratio of from about 1:1 to about 1.5:1 by weight, respectively.

In preferred embodiments of this invention pigments and thixotropic agents desirably are dispersed with epoxy ester resins which do not have an elastomeric component as does the hydroxy functional urethane modified polyester resin employed as the primary film forming resin of the compositions of this invention. It has been found that, in addition to being very effective dispersing agents for the preparation of pigment millbases and thioxtropic dispersions, non-elastomeric epoxides give the compositions toughness. One type of epoxy useful for this purpose comprises the reaction product of diepoxide, diphenol and/or dimer acid and a mixture of Soya fatty acid and propionic acid (See Example 5). Other epoxy ester resins useful for this purpose are those disclosed in U.S. patent application Ser. Nos. 448,886 filed June 14, 1982 (abandoned), 431,465 filed Sept. 30, 1982 (abandoned) and in U.S. Pat. No. 4,491,641 all assigned to the assignee of this application. These resins comprise the simultaneous reaction product of diepoxide with (i) diphenol, dicarboxylic acid or a mixture of them in chain extension reaction and (ii) fatty acid in chain terminating esterification reaction. Still other suitable epoxy resins useful for dispersing pigment and thixotropic agents will be apparent to the skilled of the art in view of the present disclosure.

No special expedients are necessary in formulating the primer compositions of this invention. For example, they may be prepared simply by incorporating the resinous components in a suitable solvent system. Thus, for example, by suitable mixing or agitation, each resinous component may be dissolved in a solvent and the resulting solutions combined to form finished primer compositions.

The solvent may be any suitable combination of organic solvents as described above. For a high solids, hot sprayable, automotive vehicle chip resistant primer, the solvent will comprise preferably about 20 to about 40 percent by weight of the total coating compositions, although of course, larger or smaller amounts may be utilized depending upon the solids content desired.

The primer is generally maintained at about 65 to about 80 percent solids content for hot spraying purposes with conventional thinners such as aromatic hydrocarbons, commercial petroleum cuts which are essentially aromatic, and the like, and sprayed onto the metal base or other substrate and cured. The primer may be applied in greater thickness of 1 to 25 mils wet, preferably 10 to 25 mils wet, in order to obtain final coatings in the desired range of 5–11 mils dry in regions highly susceptible to chipping and is then feathered down in thickness to the thickness of paints in areas not receiving a chip resistant primer. The primer is cured at elevated temperatures by any convenient means such as baking ovens or banks of infra-red heat lamps. Curing temperatures are preferably from about 135° C. to about 165° C., although curing temperatures from about 100° C. to about 230° C. may be employed, if desired.

Industrial Application

It will be apparent from the foregoing that this invention has industrial applicability as a coating composition, especially as a hot sprayable, high solids coating composition suitable for use as a chip resistant automotive vehicle primer adapted for use on body panel areas subject to chipping by stones, gravel and other road debris.

The invention will be further understood by referring to the following detailed examples. It should be understood that these specific examples are presented by way of illustration and not by way of limitation. Unless otherwise specified, all references to "parts" are intended to mean parts by weight.

The following resin examples (1–6) were prepared in a five liter round bottom flask equipped with a stirrer, reflux condenser, thermometer, and heating mantle. The flask was flushed with dry nitrogen to maintain an inert atmosphere.

EXAMPLE 1

Preparation of Hydroxy-Containing Urethane Modified Polyester Precursor

In a suitable reactor were weighed 862 parts xylene, 1070 parts Esterdiol 204 (trademark, Union Carbide, diol), and 0.04 parts dibutyl tin dilaurate catalyst. The temperature of the mixture was brought up to the point where it began to reflux. After one and a half hours, it was cooled to 105° C. 690 parts Desmondur W (trademark, Mobay Chemical Co., diisocyanate) were added to the mixture over a period of three hours. The mixture was maintained at 110° C. until no residual NCO was detected. 454 parts Tone 0301 (trademark, Union Carbide, polycaprolactone triol), 500 parts adipic acid, and 7 parts Fascat 4100 (trademark, M&T Chemical Co., catalyst) were added to the mixture. The temperature of the mixture was brought up to 155° C. At reflux, 123 parts water were collected, the heat was increased to raise the temperature to 200° C. 700 parts xylene were removed from the mixture while refluxing. The reaction was continued until solution acid number of 6 was reached. The mixture was cooled to 150° C. and 1350 parts methyl amyl ketone were added. The resulting resin had Y viscosity at 60.0% solids.

EXAMPLE 2

Preparation of Hydroxy Functional Urethane Modified Polyester Resin

In a suitable reactor were weighed 2600 parts pf the resin made in Example 1. The temperature was raised to 155° C. and the mixture was refluxed for half an hour. 800 parts epsilon-caprolactone were added to the mixture, and the temperature was maintained at 155° C. for two hours. The mixture was allowed to cool. The resulting resin had a $Z_2$ viscosity at 70.0% solids.

EXAMPLE 3

Preparation of Hydroxy Functional Urethane Modified Polyester Resin

In a suitable reactor were weighed 2000 parts of the resin made in Example 1. The temperature was raised to 155° C. and the mixture was refluxed for half an hour. 1250 parts epsilon-caprolactone and 1 part dibutyltin oxide were added to the mixture. The temperature of the mixture was maintained at 155° C. for two hours and then allowed to cool. The resulting resin had a $Z_3$ viscosity at 75% solids.

EXAMPLE 4

Preparation of Blocked Polyisocyanate Crosslinking Agent

In a suitable reactor were weighed 1078 parts 2,4-toluene diisocyanate. The temperature was brought up to 45° C. and 700 parts epsilon-caprolactam was added. The temperature slowly began to rise and 600 parts Solvesso 150 was added to the mixture. The temperature was maintained at 60° C. until an NCO equivalent of 287 was reached. 624 parts Tone 0301 (trademark, Union Carbide, polycaprolactone triol) was added to the mixture and the temperature was raised to 105°–110° C. After four hours, no residual NCO was detected via titration. 172 parts Solvesso 150 and 829 parts M-pyrol were added to the mixture which was then allowed to cool. The resulting resin had a $Z_5$ viscosity at 60.0% solids.

EXAMPLE 5

Preparation of Epoxy Ester Dispersing Resin

In a suitable reactor were weighed 1280 parts Epon 829 (trademark, Shell Chemical Co., diepoxide), 954 parts Empol 1016 (trademark, Emery Industries, dimer acid), 364 parts Soya fatty acid, 268 parts 2,2-bis(hydroxymethyl) propionic acid, and 13 parts lithium neodeconoate. The temperature of the mixture was brought up to about 180° C., at which point an exothermic reaction took place that raised the temperature to about 200° C. After one hour, the acid number was found to be less than 2. 940 parts Solvesso 100 and 305 parts Solvesso 150 were added and the mixture was cooled. The resin had a viscosity of $Z_7$ at 70.0% solids.

EXAMPLE 6

Preparation of Blocked Polyisocyanate Crosslinking Agent

In a suitable reactor were weighed 870 parts methylethyl ketoxime and 180 parts Solvesso 100. 1330 parts of PAPI 27 was added dropwise to the mixture over two hours; the reaction temperature rose from room temperature to 85°-95° C. 39 parts 2-ethylhexanol was added to the mixture and the temperature of the mixture was maintained at 85°-95° C. for one hour. At that point, 816 parts of M-pyrol was added and the mixture was cooled. The resulting resin was dark brown and had a viscosity of 6000 cps at 68.0% solids.

EXAMPLE 7

Preparation of Hydroxy Functional Urethane Modified Polyester Resin

In a suitable reactor were weighed 354 parts neo-pentyl glycol, 204 parts trimethylolpropane, 482 parts adipic acid, 4 parts dibutyl tin oxide, and 50 parts xylene. The temperature was brought up to about 130° C. and a reflux started; the mixture temperature increased to 180° C. and 120 parts of water were collected. At that point, the acid number was determined to be 1. 220 parts of M-pyrol was added to the mixture. It then was allowed to cool to 110° C. 6 drops of dibutyl tin dilaurate was added to the mixture. 160 parts Desmodur W (trademark, Mobay Chemical Co., diisocyanate) then was added dropwise to the mixture over 1 hour. The temperature of the mixture was maintained at 120° C. for 1 hour. After 1 hour no residual NCO was detected. 1085 parts epsilon-caprolactone was added to the mixture. The temperature was raised slowly to 175° C. and maintained there for 2 hours. The mixture was then cooled. 450 parts of M-pyrol was added. The resulting resin was dark brown in color and had a $Z_2$ viscosity at 75% solids.

EXAMPLE 8

Preparation of Hydroxy Functional Urethane Modified Polyester Resin

In a suitable reactor were weighed 571 parts Esterdiol 204, (trademark, Union Carbide, diol), 500 parts xylene, and 5 drops dibutyl tin dilaurate. The temperature of the mixture was brought up to the point where it began to reflux. After 1 hour, it was cooled to 110° C. 356 parts Desmodur W (trademark, Mobay Chemical Co., diisocyanate) was added dropwise over 1 hour and the temperature of the mixture was maintained at 120° C. After 2 hours, no residual NCO was detected. 240 parts trimethylolpropane, 262 parts azelaic acid, 66 parts adipic acid, and 4 parts dibutyl tin oxide were added to the mixture. The temperature of the mixture was raised to 145° C. to reflux. 300 parts of xylene was distilled from the mixture. The temperature slowly rose to 190° C., and 60 parts of water were distilled from the mixture in 2 hours. At that point, the acid number of the mixture was determined to be 1. The mixture was cooled to 170° C. and 2162 parts epsilon-caprolactone was added. The temperature was maintained at 175° C. for 2 hours. The heat was removed and 990 parts M-pyrol was added to the mixture and it was then allowed to cool. The resulting resin was dark brown in color and had a viscosity of Z at 75% solids.

EXAMPLE 9

Preparation of Hydroxy-Containing Urethane Modified Polyester Precursor

In a suitable reactor were weighed 714 parts Esterdiol 204 (trademark, Union Carbide, diol), 220 parts trimethylolpropane, 2002 parts Empol 1016 (trademark, Emery Ind., dimer acid), 100 parts xylene, and 5 parts dibutyl tin oxide. The temperature of the mixture was raised to 160° C. Water was distilled slowly from the mixture. The temperature rose to 200° C. and 120 parts of water were collected. At that point, the mixture had an acid number of 1.6. 921 parts M-pyrol was added and the mixture was cooled to 115° C. 337 parts Desmodur W (trademark, Mobay Chemical Co., diisocyanate) was added dropwise over 1 hour to the mixture. The resulting resin had a $Z_6$ viscosity at 72.8% solids.

EXAMPLE 10

Preparation of Hydroxy Functional Urethane Modified Polyester Resin

In a suitable reactor were weighed 2349 parts of the resin made in Example 9 and 726 parts epsilon-caprolactone. The temperature of the mixture was raised to 175° C. and maintained there for 2 hours. At that point, 380 parts of M-pyrol was added and the mixture was cooled. The resulting resin had a $Z_4$ viscosity at 69.2% solids.

EXAMPLE 11

Preparation of Hydroxy-Containing Urethane Modified Polyester Precursor

In a suitable reactor were charged 718 parts Esterdiol 204 (trademark, Union Carbide, diol), 506 parts xylene and 0.05 parts dibutyl tin dilaurate. The temperature of the mixture was brought up to the point where it began to reflux. After 1 hour, it was cooled to 110° C. and 464 parts of Desmodur W (trademark, Mobay Chemical Co., diisocyanate) was added dropwise to the mixture over 1 hour. The mixture was maintained at 115° C. until no residual NCO was detected. 104 parts trimethylolpropane, 1207 parts Empol 1016 (trademark Emery Ind., dimer acid), and 4 parts dibutyl tin oxide were added to the mixture. The temperature was raised to 160° C., and 350 parts of xylene and 80 parts of water were collected. The temperature of the mixture was allowed to rise to 200° C. An additional 50 parts of xylene and 20 parts of water were removed. At that point, an acid number of 3.5 was determined. 936 parts M-pyrol were added and the mixture was allowed to cool. The resulting resin was brown in color and had a $Z_2$ viscosity at 69.2% solids.

EXAMPLE 12

Preparation of Hydroxy Functional Urethane Modified Polyester Resin

In a suitable reactor were weighed 1942 parts of the resin made in Example 11 and 407 parts epsilon-caprolactone. The temperature of the mixture was raised to 175° C. and maintained there for 2 hours. 757 parts M-pyrol was added and the mixture was allowed to cool. The resulting resin had a Z viscosity at 56.4% solids.

EXAMPLE 13

Preparation of Hydroxy Functional Urethane Modified Polyester Resin

In a suitable reactor were weighed 648 parts Esterdiol 204 (trademark, Union Carbide, diol), 456 parts xylene, and 5 drops dibutyl tin dilaurate. The temperature was brought to the point where the mixture began to reflux. After one hour of refluxing, it was cooled down to 110° C. and 276 parts of toluene diisocyanate were added dropwise to the mixture over 1 hour. The temperature was maintained at 115° C. until no residual NCO was detected. 240 parts Tone 0301 (trademark, Union Carbide, polycaprolactone triol), 263 parts adipic acid, and 3 parts Fascat 4100 (trademark, M&T Chemical Co., catalyst) were added to the mixture. The temperature of the mixture was raised to 155° C. and reflux started. The temperature of the mixture continued to rise to 175° C. and 65 parts water were distilled off. At that point, the mixture had an acid number of 1.5. 1364 parts epsilon-caprolactone and 1.4 parts dibutyl tin oxide were added to the mixture. The temperature was maintained at 175° C. for 2 hours. 908 parts M-pyrol were added and the mixture was allowed to cool. The resulting resin had a Y viscosity at 73.4% solids.

EXAMPLE 14

Preparation of Hydroxy Functional Urethane Modified Polyester Resin

In a suitable reactor were charged 931 parts Esterdiol 204 (trademark, Union Carbide, diol), 266 parts trimethylolpropane, 668 parts adipic acid, 50 parts xylene, and 5 parts dibutyl tin oxide. The temperature of the mixture was brought up to reflux at 155° C. and the temperature was allowed to rise to 175° C. 166 parts of water was distilled from the mixture. At that point, the mixture had an acid number of 2.0. 764 parts xylene were added and the mixture was cooled to 110° C. 200 parts toluene diisocyanate were added over 1 hour. The temperature was maintained at 115° C. until no residual NCO was detected. 1900 parts epsilon-caprolactone and 2 parts dibutyl tin oxide were added to the mixture. The temperature was raised to 170° C. and maintained for 3 hours. 450 parts M-pyrol was added and the mixture was allowed to cool. The resulting resin had a V viscosity at 73.4% solids.

EXAMPLE 15

Preparation of Hydroxy Functional Urethane Modified Polyester Resin

In a suitable reactor are weighed 459 parts Esterdiol 204 (trademark, Union Carbide, diol), 310 parts Tone 0301 (trademark, Union Carbide, polycaprolactone triol), 423 parts azelaic acid, 4 parts dibutyl tin oxide, and 50 parts xylene. The temperature is raised slowly to 175° C. and 81 parts of water are removed. 476 parts xylene and 4 drops dibutyl tin dilaurate are added and the mixture is allowed to cool to 110° C. 190 parts Desmodur W (trademark, Mobay Chemical Co., diisocyanate) is added dropwise over 1 hour and the temperature is maintained at 115° C. until no residual NCO is detected. The temperature of the mixture is raised to reflux and 276 parts xylene are removed. 1301 parts epsilon-caprolactone is added to the mixture. The temperature of the mixtue is raised to 175° C. and maintained for 2 hours. 667 parts M-pyrol are added and the mixture is allowed to cool.

EXAMPLE 16

Preparation of Hydroxy Functional Urethane Modified Polyester Resin

In a suitable reactor are weighed 225 parts dimethyl-1,4-cyclohexanedicarboxylate, 164 parts adipic acid, 310 parts Tone 0301 (trademark, Union Carbide, polycarprolactone triol), 459 parts Esterdiol 204 (trademark, Union Carbide, diol), 4 parts dibutyl tin oxide, and 50 parts xylene. The temperature is raised slowly to 175° C. 72 parts of methanol and 40 parts of water are collected. 400 parts xylene and 0.05 parts dibutyl tin dilaurate are added and the mixture is cooled to 110° C. 180 parts Desmodur W (trademark, Mobay Chemical Co., diisocyanate) is added over 1 hour and the mixture is maintained at 115° C. until no residual NCO is observed. 1900 parts epsilon-caprolactone is added and the temperature of the mixture is raised to 175° C. It is maintained there for 2 hours. 600 parts M-pyrol is added and the mixture is cooled.

EXAMPLE 17

Preparation of Blocked Polyisocyanate Crosslinking Agent

In a suitable reactor were weighed 1080 parts Desmodur L-2291 (trademark, Mobay Chemical Co., biurette of hexamethylene diisocyanate) and 0.08 parts dibutyl tin dilaurate. 542 parts methyl ethyl ketoxime was added dropwise over 1 hour. The temperature of the mixture was allowed to rise slowly from room temperature to 90° C. The mixture was maintained at that temperature until no residual NCO was detected. 400 parts methyl amyl ketone was added and the mixture was allowed to cool.

EXAMPLE 18

| Bentone Gel Preparation | |
| --- | --- |
| To a clean Ball Mill were charged the following: | Parts |
| Solvesso 150 | 513 |
| Propylene Carbonate | 13 |
| Bentone 38 | 30 |
| Grind 30 minutes, then add: | |
| Resin of Example 5 | 384 |
| Grind approximately 2 hours to 8 Hegman | |
| Letdown with: | |
| Solvesso 150 | 60 |
| Roll 30 minutes and drop immediately | |
| This material is thixotropic. | |

EXAMPLE 19

Millbase Preparation

In a one gallon can or ball mill were charged the following materials and one quart of diagonal shot. The mixture was placed on roller mill for 16–24 hours to reach a 7+ Hegman dispersion. At that point, the letdown was added and the mixture was run an additional hour on the roller mill.

| | Parts |
| --- | --- |
| Toluene | 585 |
| 2-Ethyl Hexanol | 95 |

-continued

|  | Parts |
| --- | --- |
| Polyethylene Wax | 70 |
| Anti-Terra U* | 40 |
| Resin of Example 5 | 103 |
| Barytes | 2259 |
| TiO$_2$ | 429 |
| Carbon Black | 29 |
| Strontium Chromate | 143 |
| Letdown: | |
| Resin of Example 5 | 247 |

*Trademark of Byk Malline Krodt, Wallingford, CT. 06492, Anti-Terra U is an antisettling and wetting agent.

EXAMPLES 20-23

Coating compositions according to the invention are formulated as shown below.

| Composition | Example | | | |
| --- | --- | --- | --- | --- |
|  | 20 | 21 | 22 | 23 |
|  | Parts | | | |
| Millbase of Example 19 | 295 | 422 | 295 | 295 |
| Resin of Example 2 | 349 | 221 | | |
| Resin of Example 3 | | | 292 | 360 |
| Crosslinker of Example 4 | 228 | 209 | 266 | |
| Crosslinker of Example 6 | | | | 165 |
| Bentone gel of Example 18 | 133 | 133 | 133 | 133 |
| M-pyrol | 14 | 15 | 14 | 47 |

The coating compositions are prepared by sequential mixing in a 5 gallon working capacity EMCO Proto-Lab SW Mill (trademark, Epworth Mfg. Co., South Haven, Mich.), set at 900 rpm. The millbase, resin, crosslinker, M-pyrol are added sequentially while mixing.

The above compositions are sprayed at 140°-160° C. using hot-spray equipment commercially available from Nordson Corp. Unpolished Bonderite steel panels are sprayed and baked at 155° C. for 20 minutes. The thickness of the coating tested varies from 5 mils to 12 mils. The panels are top-coated with white enamel and tested for chip resistance using 10 pts. of gravel in the gravelometer test. All the above compositions exhibit excellent chip resistance. In addition, panels are tested for corrosion resistance (500 hrs. salt spray test, scribed panels) and humidity resistance with excellent results.

In view of this disclosure, many modifications of this invention will be apparent to those skilled in the art. It is intended that all such apparent modifications fall within the true scope of this invention and be included within the terms of the appended claims.

What is claimed is:

1. An organic solvent based, thermosetting coating composition comprising:
 (I) A hydroxy functional urethane modified polyester resin which resin has a number average molecular weight ($M_n$) of between about 2,000 and about 20,000, said resin being the product of polymerization at about 50°-300° C. of a reaction mixture of lactone monomers in the presence of hydroxy-containing urethane modified polyester precursor (i) having a number average molecular weight ($M_n$) between about 1,000 and about 10,000 (ii) having a hydroxyl number between about 30 and about 300, and (iii) containing between about 1 and about 10 urethane groups per molecule; wherein pendant hydroxyl terminated polycaprolactone moieties are formed and attached to the polyester precursor and wherein said lactone monomers are selected from those represented by the general formula:

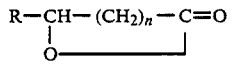

in which n is at least 4, at least n+2 R's are hydrogen, and the remaining R's are substituents selected from the group consisting of alkyl, cycloalkyl, alkoxy and single ring aromatic hydrocarbon radicals, and wherein said hydroxy-containing urethane modified polyester precursor consists of the reaction product of:
 (A) urethane modified diol being the reaction product of:
  (a) diol and (b) diisocyanate, wherein said diol and said diisocyanate are reacted in a molar ratio from about 4:1 to about 4:3, respectively;
 (B) polyol comprising at least about 5 weight percent triol; and
 (C) acid component selected from dicarboxylic acids and anhydrides thereof; and
wherein the reaction mixture comprises between about 10 and 80 weight percent of said precursor and between

|  | Example | | | | | | | | | |
| --- | --- | --- | --- | --- | --- | --- | --- | --- | --- | --- |
|  | 24 | 25 | 26 | 27 | 28 | 29 | 30 | 31 | 32 | 33 |
|  | Composition (Parts) | | | | | | | | | |
| Millbase of Example 19 | 390 | 390 | 390 | 390 | 390 | 390 | 390 | 390 | 390 | 390 |
| Resin of Example 5 | 72 | 72 | 72 | 72 | 72 | 72 | 72 | 72 | 72 | 72 |
| Resin of Example 2 | 280 | | | | | | | | | |
| Resin of Example 3 | | 260 | | | | | | | | |
| Resin of Example 7 | | | 317 | | | | | | | |
| Resin of Example 8 | | | | 317 | | | | | | |
| Resin of Example 10 | | | | | 280 | | | | | |
| Resin of Example 12 | | | | | | 346 | | | | |
| Resin of Example 13 | | | | | | | 275 | | | |
| Resin of Example 14 | | | | | | | | 270 | | |
| Resin of Example 15 | | | | | | | | | 265 | |
| Resin of Example 16 | | | | | | | | | | 260 |
| Crosslinker of Example 4 | 244 | 244 | | | | | 244 | 244 | 244 | 244 |
| Crosslinker of Example 6 | | | 144 | 144 | | | | | | |
| Crosslinker of Example 17 | | | | | 175 | 175 | | | | |
| Cab-O-Sil* | 12 | 12 | 12 | 12 | 12 | 12 | 12 | 12 | 12 | 12 |
| n-butyl acetate | 70 | 90 | 75 | 95 | 76 | 70 | 70 | 65 | 85 | 80 |

*Trademark, Cabot Corp., Boston, Mass.;
Cab-O-Sil is a fumed silica (anti-settling agent).

about 90 and about 20 weight percent of said lactone monomers; and (II) blocked polyisocyanate crosslinking agent comprising at least two isocyanate groups which have been blocked by reaction with an active hydrogen bearing blocking agent, said blocked polyisocyanate crosslinking agent being included in an amount such that upon de-blocking of the blocked isocyanate groups thereof at the cure temperature of the composition, said crosslinking agent provides between about 0.5 and about 1.6 reactive isocyanate groups per hydroxyl group on said hydroxy functional urethane modified polyester resin.

2. The solvent based, thermosetting coating composition of claim 1, wherein said precursor has a number average molecular weight between about 2000 and about 4000.

3. The solvent based, thermosetting coating composition of claim 1, wherein said precursor has a hydroxyl number between about 30 and about 200.

4. The solvent based, thermosetting coating composition of claim 1 wherein said blocked polyisocyanate crosslinking agent comprises blocked polymethylene polyphenol isocyanate which unblocked has the formula:

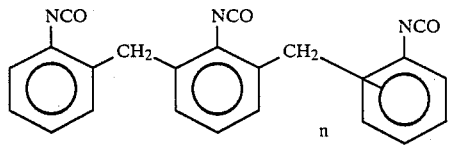

wherein n equal 1 to 3.

5. The solvent based, thermosetting coating composition of claim 1 wherein said blocked polyisocyanate crosslinking agent comprises the reaction product of an active hydrogen-bearing blocking agent with polyisocyanate comprising isocyanaurate ring-bearing polyisocyanate prepared by cyclotrimerization of diisocyanate.

6. The solvent based, thermosetting coating composition of claim 1, adapted to be used as a chip resistant primer to be sprayed elevated temperature, wherein the solids level of the composition is in the range of 60-80% by weight.

7. The coating composition of claim 1 in which the lactone monomers comprise unsubstituted epsilon-caprolactone monomers.

* * * * *